(12) United States Patent
Myrah et al.

(10) Patent No.: US 9,160,637 B2
(45) Date of Patent: Oct. 13, 2015

(54) DETERMINATION OF WHETHER STORAGE DOMAIN PATHS FOR STORAGE DEVICES INCLUDE A COMMON ROUTING MODULE

(75) Inventors: Michael G. Myrah, Cypress, TX (US); Jose Dirceu Grundler Ramos, Rio Grande do Sul (BR); Daniel Minto Ilha, Rio Grande do Sul (BR)

(73) Assignee: Hewlett-Packard Development Company, L.P., Houston, TX (US)

( * ) Notice: Subject to any disclaimer, the term of this patent is extended or adjusted under 35 U.S.C. 154(b) by 307 days.

(21) Appl. No.: 13/550,678

(22) Filed: Jul. 17, 2012

(65) Prior Publication Data

US 2014/0022885 A1     Jan. 23, 2014

(51) Int. Cl.
*H04L 12/24* (2006.01)
*H04L 29/08* (2006.01)
*H04L 12/26* (2006.01)
*H04L 29/14* (2006.01)

(52) U.S. Cl.
CPC ........ *H04L 43/0817* (2013.01); *H04L 41/0672* (2013.01); *H04L 43/16* (2013.01); *H04L 67/1097* (2013.01); *H04L 69/40* (2013.01)

(58) Field of Classification Search
CPC ................ H04L 45/28; H04L 41/0654; H04L 2012/5627; H04L 45/22; H04L 29/14; H04L 45/00; H04L 12/2422; H04L 43/0817; H04L 43/16; H04L 41/0672; H04L 67/1097; H04L 69/40; G06F 3/0601; G06F 3/0635; G06F 3/067; G06F 13/4022
USPC ........................................................ 370/216
See application file for complete search history.

(56) References Cited

U.S. PATENT DOCUMENTS

| | | |
|---|---|---|
| 5,796,690 A | 8/1998 | Kanno |
| 7,424,666 B2 | 9/2008 | Chandwani et al. |
| 7,536,584 B2 | 5/2009 | Davies et al. |
| 7,664,041 B2 | 2/2010 | Smith |
| 7,738,366 B2 | 6/2010 | Uddenberg et al. |
| 2008/0010530 A1* | 1/2008 | Davies et al. .................... 714/31 |
| 2008/0168302 A1 | 7/2008 | Cagno et al. |
| 2011/0113176 A1* | 5/2011 | Johnson et al. ............... 710/300 |
| 2012/0311256 A1* | 12/2012 | Nakajima et al. ............. 711/114 |

OTHER PUBLICATIONS

Hewlett-Packard Development Company, L.P., "Serial Attached SCSI storage technology," 2nd Edition, Jun. 2009, Hewlett-Packard Development Company, L.P.
IBM, "MAP 3350," POWER7 Information, IBM Power Systems Hardware Information Center; Mar. 24, 2012, available at <http://pic.dhe.ibm.com/infocenter/powersys/v3r1m5/index.jsp?topic=p7ebk/sasmaplinux3350.htm>.
International Committee for Information Technology Standards (INCITS), "American National Standard for Information Technology—SAS Protocol Layer (SPL)," American National Standard, Jun. 28, 2011, INCTIS 476-2011, American National Standards Institute, Inc., New York, NY.

* cited by examiner

*Primary Examiner* — Andrew Lai
*Assistant Examiner* — M Mostazir Rahman
(74) *Attorney, Agent, or Firm* — Hewlett-Packard Patent Department

(57) ABSTRACT

Examples disclosed herein relate to determination of whether storage domain paths for storage devices include a common routing module. Examples include determining whether the storage domain paths include a common routing module if a threshold stage of a storage device recovery procedure has been reached for a threshold number of storage devices within a detection time period.

15 Claims, 5 Drawing Sheets

DETERMINATION OF WHETHER STORAGE DOMAIN PATHS FOR STORAGE DEVICES INCLUDE A COMMON ROUTING MODULE

BACKGROUND

In computing systems, a storage network may include a storage domain in which a storage initiator communicates with a plurality of storage devices to store and retrieve information. Some or all of the storage devices may be remote from a computing device including the storage initiator and may be connected to the storage initiator via a plurality of routing modules. A routing module may be provided, for example, in a storage enclosure containing a collection of the storage devices, in a networking device separate from such a storage enclosure, or in the computing device containing the storage initiator.

BRIEF DESCRIPTION OF THE DRAWINGS

The following detailed description references the drawings, wherein.

DETAILED DESCRIPTION

Figure 1:
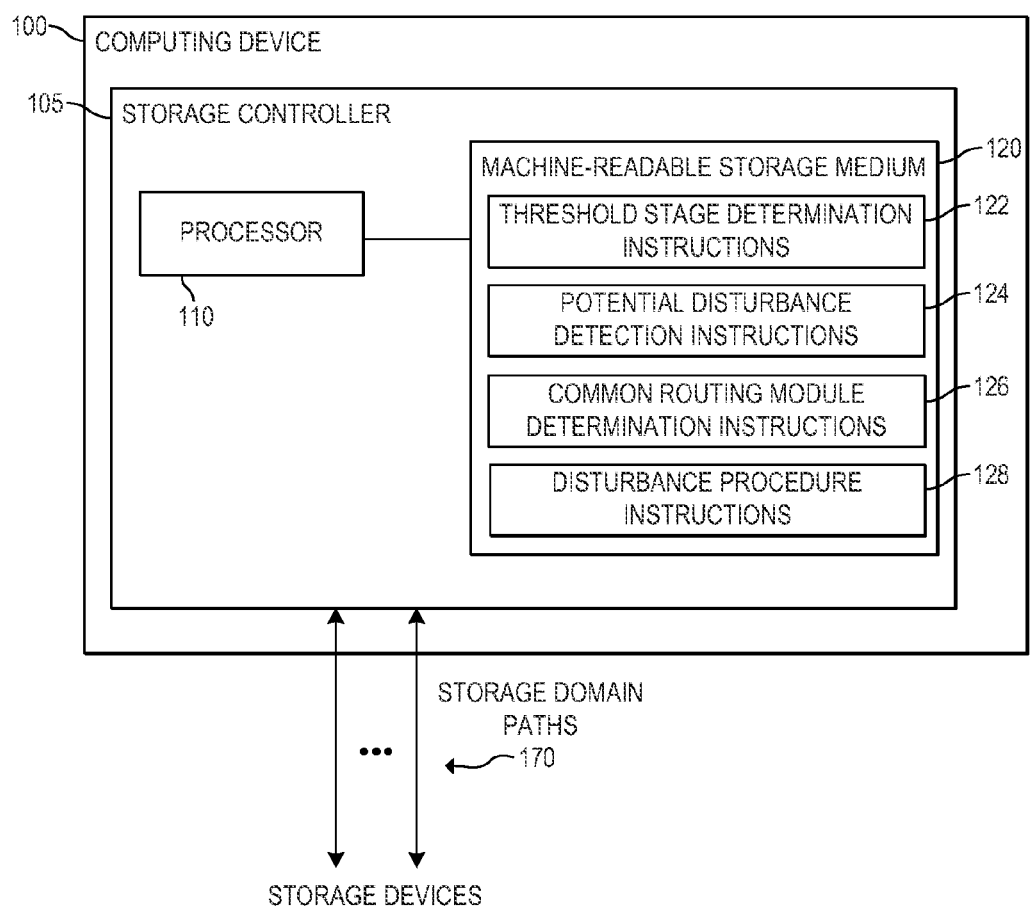
FIG. 1 is a block diagram of an example computing device to detect a potential storage domain disturbance.

As noted above, a storage domain may include a storage initiator connected to storage devices via a plurality of routing modules. Such a storage domain or fabric may at times experience disturbances, such as the malfunctioning of a routing module, cable, backplane, or another component of the storage domain. When such a storage domain disturbance occurs, the storage initiator, such as a disk array controller or other storage controller, may detect a communication failure when attempting to communicate with each of the storage devices connected through the malfunctioning component. In response to detecting a communication failure in connection with a storage device, the storage initiator may perform a storage device recovery procedure to attempt to recover communication with the storage device.

However, in the case of a storage domain disturbance, the recovery procedure may be unsuccessful for each of a plurality of storage devices connected through the malfunctioning component of the storage domain. In response to such unsuccessful recovery procedures, the storage initiator may determine that the storage devices have failed even though the storage devices actually may be functional. In such examples, the storage domain disturbance may be detected subsequently through manual inspection of data logs for the storage domain, for example. As such, the storage initiator may not detect the storage domain disturbance and may instead fail functioning storage devices.

To address these issues, examples described herein may detect a potential storage domain disturbance in response to detecting communication failures for a threshold number of storage devices within a given time period. Since a plurality of storage devices are unlikely to fail independently within a short period of time, examples described herein may consider respective communication failures for a plurality of storage devices within a given time period to be indicative of a potential storage domain disturbance.

For example, examples described herein may detect a potential storage domain disturbance if a storage controller has reached a threshold stage of a recovery procedure for each of a threshold number of storage devices, connected to the storage device via a respective storage path domain, within a detection time period. In response to detecting the potential storage domain disturbance, some examples may determine whether the respective storage domain paths, for the storage devices for which the storage controller has reached the threshold stage, include a common routing module. In such examples, the presence of a common routing module may indicate that the communication failures are not independent, but rather are the result of a domain disturbance, such as malfunctioning of the common routing device, for example.

Examples described herein may also perform a disturbance response procedure, in response to a determination that the respective storage domain paths include a common routing module. The disturbance response procedure may include, for example, outputting a storage domain disturbance prediction notice indicating that a storage domain disturbance may have occurred, or attempting to resolve the disturbance by resetting the common routing module, for example. In this manner, examples described herein may predict the occurrence of a storage domain disturbance and indicate or attempt to resolve the predicted disturbance rather than erroneously failing a plurality of functional storage devices due to a storage domain disturbance.

Referring now to the drawings, FIG. 1 is a block diagram of an example computing device 100 to detect a potential storage domain disturbance. As used herein, a "computing device" may be a desktop computer, notebook computer, workstation, server, computer networking device, a chip set, or any other processing device or equipment. In the example of FIG. 1, computing device 100 includes a storage controller 105 comprising a processor 110 and a machine-readable storage medium 120 encoded with instructions 122, 124, 126, and 128. In some examples, storage medium 120 may include additional instructions. In other examples, instructions 122, 124, 126, 128, and any other instructions described herein in relation to storage medium 120 may be stored remotely from computing device 100.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processor 110 may fetch, decode, and execute instructions stored on storage medium 120 to implement the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, each of a plurality of storage devices is connected to receive input/output (I/O) communications from storage controller 105 via a respective storage domain path of a plurality of storage domain paths 170. As used herein, a "storage domain" is an information storage system that includes a storage controller and a plurality of storage devices connected to receive I/O communications from the storage controller either directly or via at least one routing module. As used herein, a "storage domain path" is a collection of interconnected components of a storage domain that form a route through which a storage controller of the storage domain may communicate with a storage device of the storage domain. A storage domain path may include, for example, each routing module that forms part of a particular route through which a particular storage controller may communicate with the storage device. Also, as used herein, a storage domain path "for" a given storage device is a storage domain path through which a storage controller may communicate with the given storage device.

As used herein, a "storage controller" is a module able to request input/output (I/O) operations at any of a plurality of storage devices via at least one routing module. Storage controllers may also request I/O operations at storage devices connected to the storage controller without any intervening routing module. A storage controller may be, for example, a disk array controller, a Serial Attached Small Computer System Interface (SAS) initiator, an initiator of another storage networking protocol (e.g., Fibre Channel Protocol (FCP), etc.), or the like. In some examples, the storage controller may include at least one initiator port through which the storage controller may request I/O operations at a storage device. In some examples, storage controller may be a hardware device, such as an expansion card (e.g., a Peripheral Component Interconnect (PCI) card), or another type of device comprising a printed circuit board. As used herein, a "routing module" is a switch, expander, or other device or component including a plurality of ports and capable of routing communications received on one port of the module to another port of the module based on a destination address. A routing module may be, for example, an SAS expander. Also, as used herein, a "storage device" may be any machine-readable storage medium. For example, any storage device described herein may be a SAS drive (e.g., a SAS hard disk drive, a SAS solid-state drive (SSD), etc.), a Serial AT Attachment (SATA) drive (e.g., SATA hard disk drive), or the like.

In the example of FIG. 1, storage controller 105 may detect when a communication failure occurs in connection with any of the storage devices connected via one of storage domain paths 170. For example, if storage controller 105 determines that a timeout period has elapsed without receiving a response to an I/O communication provided to one of the storage devices, then storage controller 105 may determine that a communication failure has occurred in relation to the storage device. In response to detecting such a communication failure in connection with one of the storage devices, storage controller 105 may trigger a storage device recovery procedure for the storage device. In some examples, the storage device recovery procedure may include a plurality of stages that may be performed sequentially by storage controller 105 to attempt to restore communication with the storage device for which the communication failure was detected. The respective stages may include, for example, at least one of retrying the failed I/O communication at least once, requesting a soft reset (e.g., a Small Computer System Interface (SCSI) reset) at the storage device, requesting a hard reset at the storage device, requesting that the storage device perform a power cycle, and the like. In some examples, a final stage of the recovery procedure may be to determine that the storage device has failed and cease communication with the storage device, if I/O communication is not restored by any of the prior stages.

In some examples, storage controller 105 may include a recovery module to detect communication failures and perform the storage device recovery procedure. In such examples, the functionalities of the recovery module may be implemented in the form of electronic circuitry, in the form of executable instructions encoded on a machine-readable storage medium, or a combination thereof. In some examples, the recovery module may be implemented in the form of executable instructions encoded on storage medium 120.

In the example of FIG. 1, instructions 122 may, for each of the storage devices connected via a respective one of storage domain paths 170, detect whether storage controller 105 has reached a threshold stage of the storage device recovery procedure for the storage device. In some examples, instructions 122 maintain a record of the storage devices for which storage controller 105 has reached the threshold stage of the recovery procedure. For example, in response to detecting that storage controller 105 has reached a threshold stage of the recovery procedure for a storage device, instructions 122 may flag the storage device in a table or other list of the storage devices connected to storage controller 105. In some examples, the storage device list (e.g., table, etc.) may be stored on storage controller 105.

In some examples, instructions 122 may also record the time at which the storage device was flagged or at which storage controller 105 reached the threshold stage for the storage device. Instructions 122 may store such time information in the storage device list storing the flags for the storage devices. In some examples, the threshold stage of the recovery process may be defined to be any stage in the recovery process. For example, the threshold stage may be a first stage of the recovery procedure, such as the stage in which storage controller 105 retries the failed I/O communication to the storage device. In such examples, in response to storage controller 105 determining that an I/O communication to a storage device has failed, storage controller 105 may begin the recovery process by trying the failed I/O communication and instructions 122 may determine that storage controller 105 has reached the threshold stage of the recovery procedure. In such examples, instructions 122 may flag the storage device before or after storage controller 105 actually retries the failed I/O communication.

In other examples, the threshold stage may be a later stage in the recovery procedure. For example, the threshold stage may be defined as a stage in which storage controller 105 commands the storage controller to reset after at least one unsuccessful attempt to retry the failed I/O communication. In such examples, instructions 122 may determine that storage controller 105 has reached the threshold stage of the recovery procedure, and flag the storage device at issue, after at least one unsuccessful attempt to retry the failed I/O communication.

Instructions 124 may detect a potential storage domain disturbance if the storage controller has reached the threshold stage for each of a threshold number of the storage devices within a detection time period. For example, in response to instructions 122 determining that storage controller 105 has reached the threshold stage for one of the storage devices, instructions 124 may examine the list of storage devices to see how many storage devices have been flagged, within the detection time period, as being devices for which storage controller 105 reached the threshold stage of the recovery process. In such examples, instructions 124 may detect a potential storage domain disturbance if the list indicates that storage controller 105 reached the threshold stage for a threshold number of the storage devices within the detection time period. In some examples, the threshold number of storage devices may be any suitable number greater than one.

In some examples, the threshold number may be selected such that the failure of that number of storage devices within the detection time period is likely to be the result of a storage domain disturbance and not independent storage device failures. For example, the threshold number may be set high enough that there is a very low probability of that number of storage devices independently failing within the detection time period. In some examples, a domain disturbance, such as a malfunctioning routing module, may cause all of the storage devices connected to the storage controller through that routing module to become inaccessible simultaneously or very near in time. As such, in some examples, the detection time period may be set to be a very short period of time such that instructions 124 may detect a potential domain disturbance when the threshold number of storage devices are determined to be failing (e.g., reach the threshold stage of the recovery procedure) very near in time to one another. In some examples, the detection time period may be a number of minutes (e.g., 10 minutes), a number of seconds (i.e., less than a minute), or any other time period suitable for detecting that a plurality of storage devices have experienced I/O communication failure very near in time to one another.

In some examples, in response to instructions 124 detecting a potential storage domain disturbance, instructions 124 may cause storage controller 105 to pause any storage device recovery procedures being performed or that would otherwise be started by storage controller 105 after the detection of the potential storage domain disturbance. In such examples, storage controller 105 may pause all such recovery procedures in progress or to be started such that they may each be resumed or started subsequently.

Also, in response to instructions 124 detecting a potential storage domain disturbance, instructions 126 may determine whether the respective storage domain paths, for the storage devices for which the storage controller has reached the threshold stage, include at least one common routing module. As used herein, a "common routing module" included in a plurality of storage domain paths is a routing module that is included in all of the storage domain paths of the plurality of storage domain paths. In such examples, instructions 126 may examine the storage domain paths for the storage devices flagged within the detection time period to determine whether the paths include a common routing module. For example, storage controller 105 may store a representation of each of the storage domain paths 170 from storage controller 105 to the plurality of storage devices, respectively. In such examples, instructions 126 may examine the representations of the storage domain paths for the storage devices flagged within the detection time period to determine whether the paths include at least one common routing module.

In some examples, instructions 126 may search for common routing modules by traversing the respective representations of the storage domain paths for the flagged storage devices, identifying each routing module common to all of the storage domain paths. In such examples, instructions 126 may traverse each path representations from the storage controller to a respective one of the storage devices. In other examples, instructions 126 may search for common routing modules among the storage domain paths in any other suitable manner. In some examples, instructions 126 may identify all common routing module included in the respective storage domain paths for the flagged storage devices.

If instructions 126 determine that the respective storage domain paths include at least one common routing module, then instructions 128 may perform a disturbance response procedure. Alternatively, if instructions 126 determine that the respective storage domain paths do not include a common routing module, then instructions 126 may determine that a fabric disturbance has not occurred and, in response, may resume or start any previously paused storage device recovery procedures of storage controller 105.

In some examples, the disturbance response procedure may include providing a disturbance prediction notice to indicate that a storage domain disturbance has been predicted. For example, instructions 128 may provide the notice to a user of computing device 100, to an event log of computing device 100, or the like, or a combination thereof. For example, instructions 128 may provide the notice via an operating system (OS) of computing device 100. In some examples, the notice may include an indication of a potential source of the storage domain disturbance, such as at least one common routing module determined by instructions 126 to be in each of the respective storage domain paths for the flagged storage devices. In such examples, the notice may additionally include a representation of a portion of a storage domain path from storage controller 105 to a common routing module identified by instructions 126.

In other examples, the disturbance response procedure may, alternatively or in addition, include the performance of at least one action to attempt to resolve the storage domain disturbance to restore I/O communication with the flagged storage devices. For example, if instructions 126 determine that the respective storage domain paths for the flagged storage devices all include a common routing module, then instructions 128 may reset the common routing module, as part of the disturbance response procedure.

In some examples, instructions 128 may reset the highest common routing module of the respective storage domain paths. As used herein, a "highest common routing module" of a set of storage domain paths connecting a storage controller to respective storage devices is the routing module, among the routing modules common to all of the storage domain paths of the set, that has the fewest other routing modules intervening between it and the storage controller. In some examples, instructions 126 may identify the highest common routing module of the storage domain paths for the flagged storage devices.

In other examples, if instructions 126 determine that the respective storage domain paths for the flagged storage devices all include at least one common routing module, then instructions 128 may reset each common routing module among the respective storage domain paths, as part of the disturbance response procedure. In such examples, instructions 128 may reset every routing module identified by instructions 126 as being included in each of the respective storage domain paths of the flagged storage devices. In examples in which there are multiple routing modules common to the storage domain paths of the flagged storage device, it may be unclear which of the common routing modules may be malfunctioning. As such, in this manner, instructions 128 may attempt to resolve the disturbance by resetting each of the common routing modules.

In some examples, if instructions 126 determine that the respective storage domain paths for the flagged storage devices all include at least one common routing module, then instructions 128 may, for each of the flagged storage devices, reset each routing module of the respective storage domain path for the flagged storage device as part of the disturbance response procedure. Additionally, in examples in which any routing module to be reset is connected to a plurality of storage controllers (e.g., in a zoning environment in which multiple storage controllers share at least one routing module), instructions 128 may command the routing module to enter a reduced functionality mode prior to the routing module being reset. In response, the routing module may broadcast a notice (e.g., to each connected storage controller) that the routing module will enter a reduced functionality mode and subsequently enter the reduced functionality mode. In such examples, the other storage controller connected to the routing module may receive the broadcast and interact with the routing module in the reduced functionality mode. After the routing module enters the reduced functionality mode, instructions 128 may then reset the routing module. In this manner, the routing module may be reset without causing the routing module to lose links associated with the other storage controller.

In examples described herein, instructions 128 may reset a routing module by providing a command or request that the routing module perform any suitable reset operation of the routing module. In some examples, instructions 128 may provide the command or request via a portion of one of the storage domain paths for one of the flagged storage devices. In some examples, instructions 128 may additionally or alternatively take other actions to resolve a domain disturbance as part of the disturbance response procedure. Additionally, in some examples, after instructions 128 complete the disturbance response procedure, instructions 126 may then stop or otherwise cancel any previously paused storage device recovery procedures of storage controller 105. In such examples, after performing the disturbance response procedure, instructions 126 may also clear the flags from the storage device list and cause storage controller 105 to retry the respective failed I/O communications for each of the previously flagged storage devices.

In some examples, storage controller 105 may be a SAS initiator and computing device 100 may be a server including the SAS initiator. In such examples, the routing modules of the respective storage domain paths for the storage devices connected to storage controller 105 (e.g., a SAS initiator) may be SAS expanders. In such examples, in response to instructions 124 detecting a potential storage domain disturbance, instructions 126 may determine whether respective storage domain paths for the flagged storage devices for which the storage controller has reached the threshold stage include at least one common SAS expander. If instructions 126 determine that the paths do include at least one common SAS expander, instructions 128 may reset at least one of the common SAS expanders, as part of the disturbance response procedure. In some examples, functionalities described herein in relation to FIG. 1 may be provided in combination with functionalities described herein in relation to any of FIGS. 2A-5.

Figure 2A:
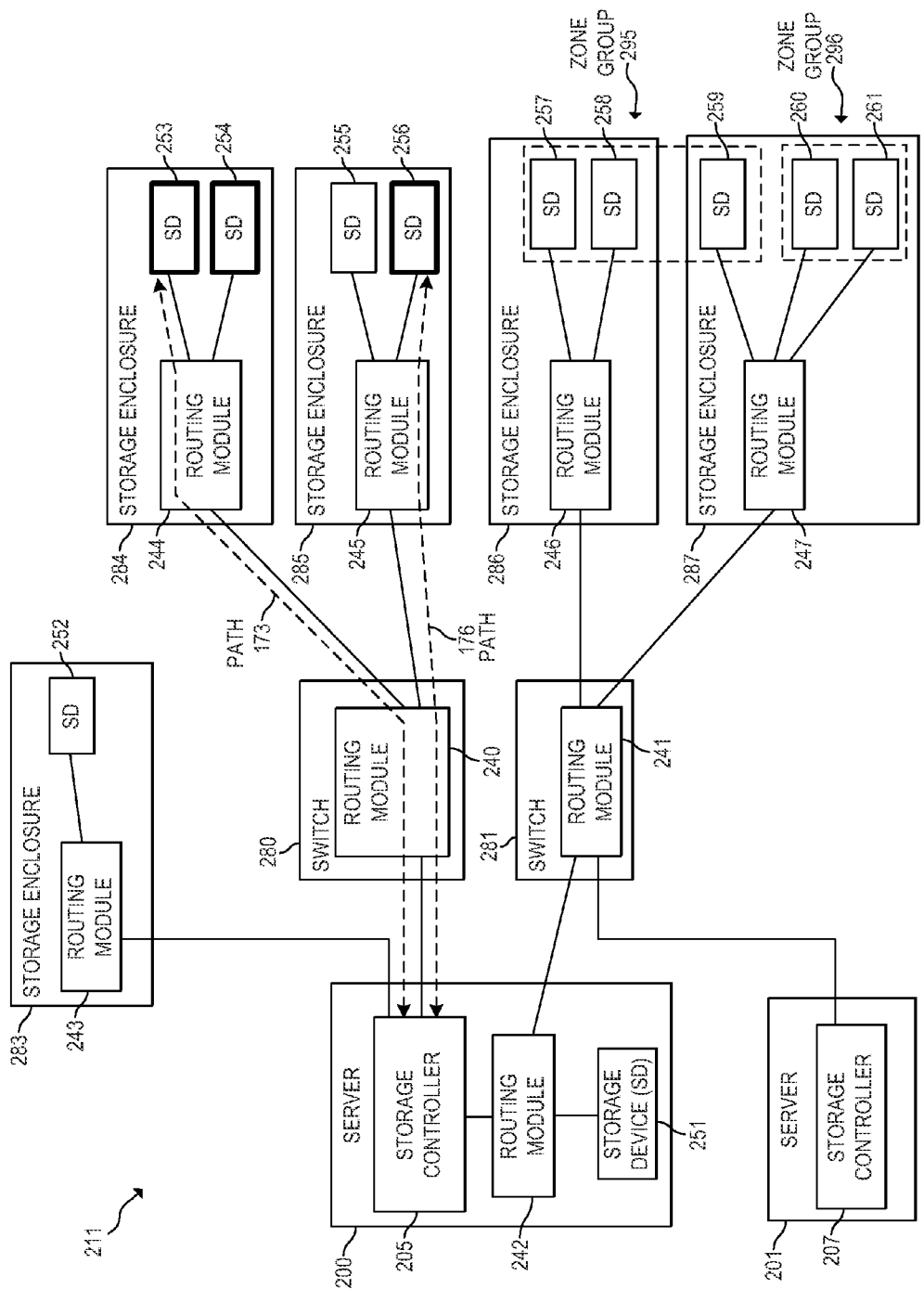
FIG. 2A is a diagram of an example storage domain including a plurality of storage devices connected to a storage controller via routing modules.

FIG. 2A is a diagram of an example storage domain including a plurality of storage devices connected to a storage controller via routing modules. In the example of FIG. 2A, storage domain 211 may include servers 200 and 201, each of which may implement any of the functionalities described above in relation to computing device 100 of FIG. 1. Server 200 may include a storage controller 205 and server 201 may include a storage controller 207. In some examples, each of storage controllers 205 and 207 may implement any of the functionalities described above in relation to storage controller 105 of FIG. 1. Server 200 may also include a storage device 251 and a routing module 242 that connects storage controller 205 to storage device 251. In some examples, the functionalities of storage controller 205 may be implemented in the form of electronic circuitry, in the form of executable instructions encoded on a machine-readable storage medium, or a combination thereof.

In the example of FIG. 2A, storage domain 211 also includes switches 280 and 281, and storage enclosures 283, 284, 285, 286, and 287. Each of the storage enclosures may include at least one routing module connected to at least one storage device. In the example of FIG. 2A, switch 280 includes a routing module 240 that connects storage controller 205 to routing modules 244 and 245 of storage enclosures 284 and 285, respectively. Switch 281 includes a routing module 241 that connects storage controller 205 (via routing module 242) to routing modules 246 and 247 of storage enclosures 286 and 287, respectively. Routing module 241 is also connected to storage controller 207 of server 201.

Storage enclosure 283 includes a routing module 243 that connects storage controller 205 to storage device 252 of storage enclosure 283. Storage enclosure 284 includes storage devices 253 and 254 connected to routing module 244, and storage enclosure 285 includes storage devices 255 and 256 connected to routing module 245. Additionally, storage enclosure 286 includes storage devices 257 and 258 connected to routing module 246, and storage enclosure 287 includes storage devices 259, 260, and 261 connected to routing module 247.

Although each storage enclosure in the example of FIG. 2A is illustrated as including one routing module and one to three storage devices, each of the storage enclosures may include a plurality of routing modules, more storage devices than illustrated, or both. Additionally, in the example of FIG. 2A, each illustrated connection extending from a routing module to another component of storage domain 211 (e.g., a storage controller, a storage device, etc.), may represent a plurality of links between those components.

Additionally, routing modules 241, 246, and 247 may be zoning routing modules (e.g., zoning expanders) to implement access controls via a plurality of zone groups. In the example of FIG. 2A, routing modules 241, 246, and 247 implement a zone group 295 including storage devices 257, 258, and 259. Additionally, routing modules 241 and 247 implement a zone group 296 including storage devices 260 and 261. In the example of FIG. 2A, routing modules 241, 246, and 247 may provide storage controller 205 access to zone group 295, and routing modules 241 and 247 may provide storage controller 207 access to zone group 296.

In the example of FIG. 2A, storage domain 211 includes a plurality of storage domain paths, including a storage domain path 173 between storage controller 205 and storage device 253, and a storage domain path 176 between storage controller 205 and storage device 256. Although two example storage domain paths of storage domain 211 are specifically denoted in FIG. 2A (e.g., paths 173 and 176), storage domain 211 forms a respective storage domain path between storage controller 205 and each of storage devices 251-259, and forms a respective storage domain path between storage controller 207 and each of storage devices 260 and 261. In some examples, the functionalities of storage controller 207 may be implemented in the form of electronic circuitry, in the form of executable instructions encoded on a machine-readable storage medium, or a combination thereof.

In some examples, the example storage domain 211 may be a SAS fabric. In such examples, storage controllers 205 and 207 may be SAS initiators, switches 280 and 281 may be SAS switches, and each of routing modules 240-247 may a SAS expander. However, in other examples, storage domain 211 may be any other type of storage domain, such as a storage domain implementing another storage networking protocol.

Figure 2B:
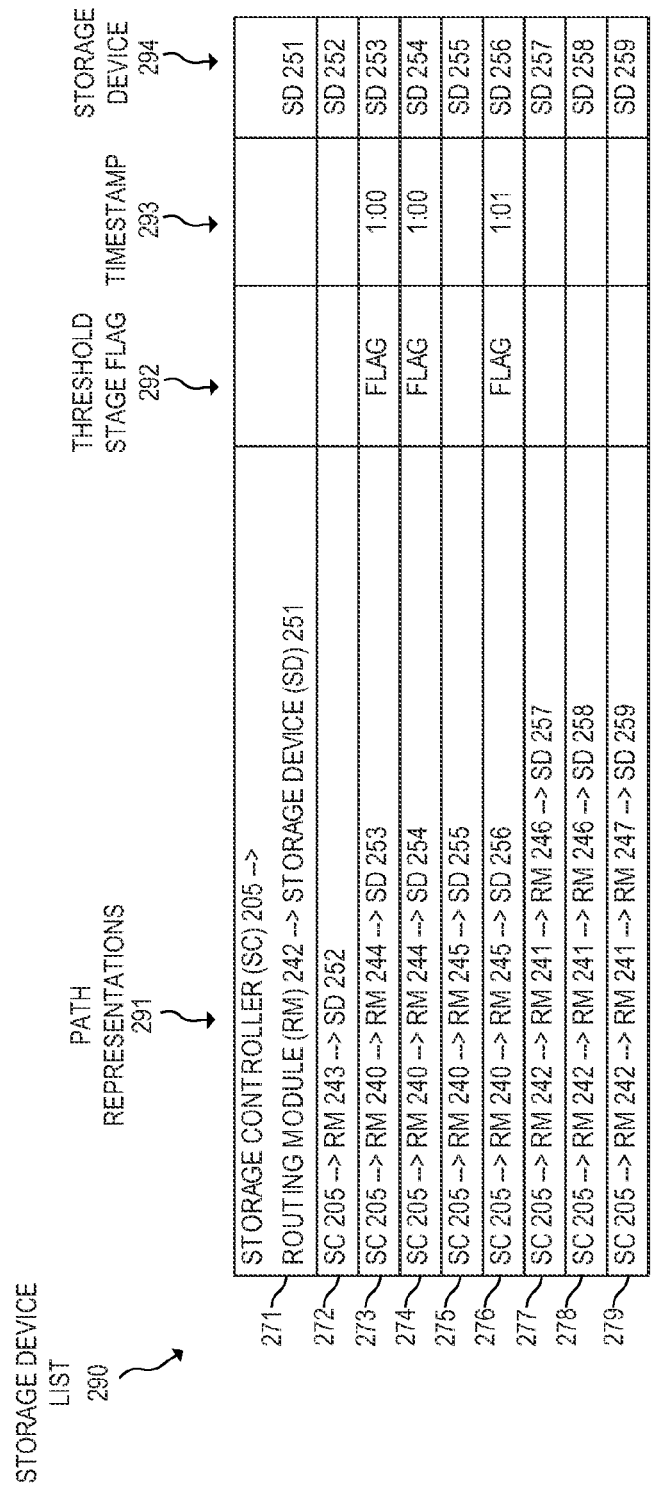
FIG. 2B is a diagram of an example storage device list including representations of storage domain paths for a collection of storage devices connected to the storage controller of FIG. 2A.

FIG. 2B is a diagram of an example storage device list 290 including representations of storage domain paths for a collection of storage devices connected to storage controller 205 of FIG. 2A. In some examples, storage controller 205 may manage storage device list 290, which may include information for each of the storage devices 251-259 connected to receive I/O communications from storage controller 205. In some examples, storage device list 290 may be stored on storage controller 205. Although storage device list 290 is illustrated in the form of a table in the example of FIG. 2B, the information in list 290 may be stored and managed by storage controller 205 in any type of list or any other suitable format, data structure, or the like.

In the example of FIG. 2B, list 290 includes, for each of storage devices 251-259, a representation of a storage domain path from storage controller 205 to the storage device. For example, list 290 may include, in a path representation column 291, representations 271-279 of storage domain paths for storage devices 251-259, respectively. Each of path representations 271-279 is a representation of a storage domain path from storage controller 205 to a respective one of storage devices 251-259. Although, in the example of FIG. 2B, path representations 271-279 include representations of both storage controller 205 and the respective storage device, in other examples, the path representations may omit at least one of storage controller 205 and the respective storage device from the path representation.

In the example of FIG. 2B, list 290 may also include a threshold stage flag column 292 in which storage controller 205 may store, for any of storage devices 251-259, a threshold stage flag if storage controller 205 reaches the threshold stage of the storage device recovery procedure for the storage device, as described above in relation to storage controller 105 of FIG. 1. List 290 may also include a timestamp column 293 in which storage controller 205 may store, for any of storage devices 251-259, a time information indicating when the storage device was flagged or when storage controller 205 reached the threshold stage for the storage device. In some examples, list 290 may also include a storage device column 294 identifying the storage device associated with the information stored in that row.

Example functionalities of a storage controller 205 are described below in relation to FIGS. 2A and 2B. As noted above, storage controller 205 may implement any of the functionalities described above in relation to storage controller 105 of FIG. 1. For example, storage controller 205 may detect when a communication failure occurs in connection with any of storage devices 251-259 connected to storage controller 205 via a storage domain path of storage domain 211. In response, storage controller 205 may trigger a storage device recovery procedure for the storage device for which the communication failure occurred and detect when storage controller 205 has reached a threshold stage of the storage device recovery procedure for the storage device. In response to reaching the threshold stage for a storage device, storage controller 205 may flag the storage device in storage device list 290.

For example, storage controller 205 may trigger the recovery procedure in relation to storage device 253 if storage controller 205 detects a communication failure in relation to storage device 253. Additionally, as shown in FIG. 2B, storage controller 205 may flag storage device 253, in threshold stage flag column 292 of list 290, in response to detecting that storage controller 205 has reached the threshold stage of the recovery procedure for storage device 253. Storage controller 205 may also record the time at which storage device 253 was flagged. For example, as illustrated in FIG. 2B, storage controller 205 may store in a timestamp column 293 of list 290 a time (e.g., 1:00) at which storage device 253 was flagged. Storage controller 205 may store the time in list 290 in any suitable format.

In the example illustrated in FIGS. 2A and 2B, storage controller 205 may also trigger the recovery procedure for storage devices 254 and 256 in response to detecting communication failures in relation to storage devices 254 and 256. Additionally, as shown in FIG. 2B, storage controller 205 may flag storage devices 254 and 256 in response to detecting that storage controller 205 has reached the threshold stage of the recovery procedure for each of those storage devices. Storage controller 205 may also store respective times (e.g., 1:00 and 1:01), suitably formatted, corresponding to the flags stored for storage devices 254 and 256 in list 290.

Storage controller 205 may also detect a potential storage domain disturbance if storage controller 205 has reached the threshold stage for each of a threshold number of the storage devices within a detection time period. The threshold number may be, for example, three storage devices, and the detection time period may be, for example, ten minutes. In such examples, after flagging storage device 256 in list 290, storage controller 205 may examine list 290 and determine that it has reached the threshold stage for the threshold number of the storage devices within the detection time period by, for example, determining that the threshold number of storage devices (e.g., three) have been flagged within the detection time period.

In response to detecting a potential storage domain disturbance, storage controller 205 may determine whether the respective storage domain paths for flagged storage devices 253, 254, and 256 (i.e., the storage devices for which the storage controller has reached the threshold stage) include at least one common routing module. In the example of FIGS. 2A and 2B, storage controller 205 may examine path representations 273, 274, and 276 of list 290, representing the respective storage domain paths for storage devices 253, 254, and 256, to determine whether the respective storage domain paths include a common routing module. In such examples, storage controller 205 may determine from the stored path representations that the respective storage domain paths do include a common routing module, namely routing module 240.

In response, storage controller 205 may perform a disturbance response procedure. For example, storage controller 205 may reset common routing module 240. In other examples, storage controller 205 may reset each routing module in the respective storage domain paths for storage devices 253, 254, and 256 as part of the disturbance response procedure. For example, based on path representations 273, 274, and 276 of list 290, storage controller 205 may reset each of routing modules 240, 244, and 245. After performing the disturbance response procedure, storage controller may then cancel or otherwise stop any previously paused storage device recovery procedures of storage controller 205. In some examples, after performing the disturbance response procedure, storage controller 205 may also clear the threshold stage flags from list 290 and retry the respective failed I/O communications for each of the previously flagged storage devices.

In other examples, storage controller 205 may detect communication failures in relation to other storage devices. For example, storage controller 205 may detect communication failures in relation to storage devices 257, 258, and 259, and flag each of storage devices 257, 258, and 259 in list 290 in response to reaching the threshold stage of the recovery procedure for each of the devices. In such examples, storage controller 205 may detect a potential storage domain disturbance if the threshold number is three and list 290 indicates that the devices were flagged within the detection time period. In response to detecting a potential storage domain disturbance in this manner, storage controller 205 may determine whether the respective storage domain paths for flagged storage devices 257, 258, and 259 include at least one common routing module. In the example of FIGS. 2A and 2B, storage controller 205 may examine path representations 277, 278, and 279 of list 290, representing the respective storage domain paths for storage devices 257, 258, and 259. In such examples, storage controller 205 may determine from the stored path representations that the respective storage domain paths do include at least one common routing module (e.g., routing module 241 or 242, or both).

In response, storage controller 205 may perform a disturbance response procedure. For example, storage controller 205 may reset the highest common routing module, namely routing module 242. In other examples, storage controller 205 may reset each common routing module among the respective storage domain paths for storage devices 257, 258, and 259, namely routing modules 241 and 242. In still other examples, storage controller 205 may reset each routing module in the respective storage domain paths for storage devices 257, 258, and 259, namely routing modules 241, 242, 246, and 247.

Additionally, prior to resetting any zoning routing module (e.g., routing modules 241, 246, and 247), storage controller 205 may command the routing module to enter a reduced functionality mode. For example, prior to resetting routing module 241, storage controller 205 may command routing module 241 to enter a reduced functionality mode so that resetting routing module 241 does not cause routing module 241 to lose its links to storage devices 260 and 261 of zone group 296, with which storage controller 207 communicates via routing module 241. In such examples, prior to entering the reduced functionality mode, routing module 241, for example, may broadcast a notice to inform at least storage controller 207 that it will be entering the reduced functionality mode.

In other examples, storage controller 205 may detect communication failures in relation to storage devices 252, 253, and 259, and flag those storage devices in list 290 when storage controller 205 reaches the threshold stage of the recovery procedure for each of those storage devices, respectively. In examples in which the threshold number of storage devices is three and the devices are flagged within the detection time period, storage controller 205 may detect a potential domain disturbance in response to storage devices 252, 253, and 259 being flagged within the detection time period. However, storage controller 205 may determine that the respective storage domain paths for storage devices 252, 253, and 259 do not include a common routing module, based on the path representations in list 290. In response, storage controller 205 may determine that a fabric disturbance has not occurred. In such examples, storage controller 205 may then resume or start any previously paused storage device recovery procedures of storage controller 105.

Figure 3:
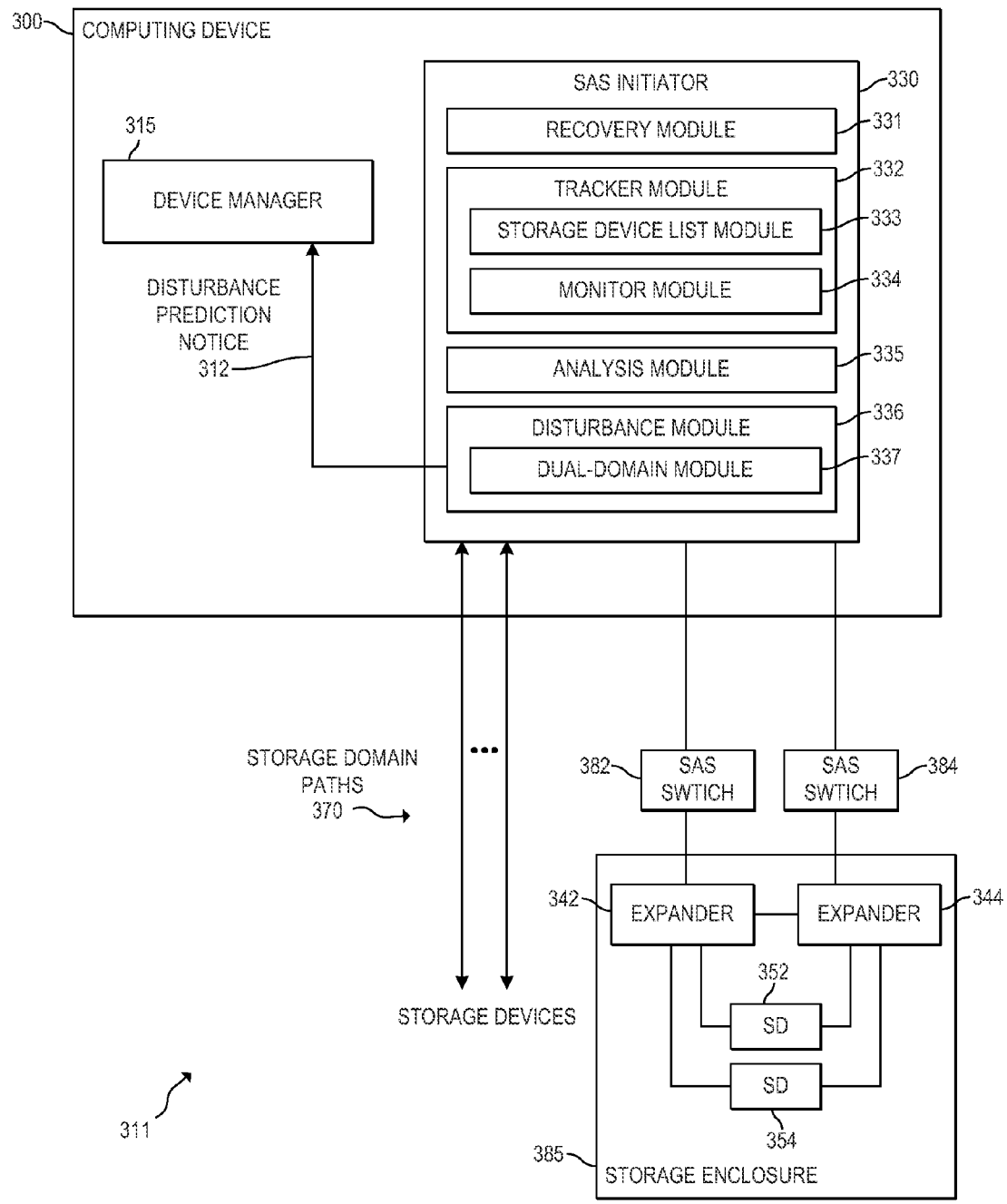
FIG. 3 is a block diagram of an example storage domain to perform a storage domain disturbance procedure.

FIG. 3 is a block diagram of an example storage domain 311 to perform a storage domain disturbance procedure. Storage domain 311 may comprise a computing device 300, including a device manager 315 and a storage controller. In the example of FIG. 3, the storage controller may be a SAS initiator 330 including modules 331-337. In some examples, SAS initiator 330 may include additional modules. The functionalities of SAS initiator 330, including the functionalities of modules 331-337, may be implemented in the form of executable instructions encoded on a machine-readable storage medium, in the form of electronic circuitry, or a combination thereof.

In the example of FIG. 3, storage domain 311 may also include a storage enclosure 385 including SAS expanders 342 and 344 and including storage devices 352 and 354. In other examples, SAS expanders 342 and 344 may be any other type of routing module described above in relation to FIG. 1. In the example of FIG. 3, storage domain 311 also includes storage domain paths 370 connecting SAS initiator 330 to each of a plurality of storage devices. In such examples, storage domain paths 370 include storage domain paths connecting storage devices 352 and 354 of a storage enclosure 385 to SAS initiator 330. For example, storage domain 311 may include a dual-domain configuration in relation to the storage devices of storage enclosure 385. In such examples, storage devices 352 and 354 of storage enclosure 385 may each be connected to SAS initiator 330 via a first storage domain path including a SAS switch 382 and SAS expander 342, and via a second storage domain path including a SAS switch 384 and SAS expander 344. In some examples, each of SAS switches 382 and 384 may include a routing module, such as a SAS expander.

In the example of FIG. 3, recovery module 331 of SAS initiator 330 may trigger a storage device recovery procedure for any of a plurality of storage devices connected to receive I/O communications from SAS initiator 330 via a respective storage domain path. For example, module 331 may trigger the recovery procedure for a given storage device connected via one of storage domain paths 370, in response to detecting an I/O communication failure in relation to the given storage device, as described above in relation to FIG. 1. For example, module 331 may trigger the recovery procedure in relation to a storage device in response to detecting a timeout in relation to an I/O communication sent to the storage device.

Module 332 may, for each of the storage devices, track whether recovery module 331 has reached a threshold stage of the recovery procedure for the storage device. For example, module 332 may include a module 333 to maintain a storage device list indicating, for each of the storage devices, the respective storage domain path for the storage device and whether the recovery module has reached the threshold stage for the storage device. For example, module 333 may maintain a list including, for each storage device, a representation of the storage domain path for the storage device, a threshold stage flag field, and a timestamp field, in any suitable format. In some examples, module 333 may maintain a storage device list as described above in relation to storage device list 290 of FIG. 2B. In some examples, in response to module 332 determining that recovery module 331 has reached a threshold stage of the recovery procedure for a given storage device, module 333 may update the storage device list to indicate that the recovery module has reached the threshold stage for the given storage device. For example, module 333 may flag the given storage device in the storage device list.

In some examples, the threshold stage of the recovery procedure may be a stage in which the recovery module is to retry a failed I/O communication. In some examples, this stage may be a first stage of the recovery procedure. In other examples, the threshold stage may be a later stage in the recovery procedure. For example, the threshold stage of the recovery procedure may be a stage of the recovery procedure in which the recovery module is to reset the given storage device reset after retrying a failed I/O communication in connection with the given storage device. In such examples, SAS initiator 330 may allow recovery module 331 to take action to resolve an I/O communication failure in relation to a storage device prior to tracker module 332 flagging the storage device in the storage device list and potentially triggering detection of a potential domain disturbance.

In some examples, module 332 may also include a monitor module 334 that may determine, from the storage device list, whether recovery module 331 has reached the threshold stage of the recovery procedure for a threshold number of storage devices within a detection time period. In some examples, module 334 may make this determination, for example, in response to the storage device list being updated to indicate that recovery module 331 has reached the threshold stage for one of the storage devices. Additionally, in some examples, module 334 may make this determination by detecting whether the threshold number of storage devices have been flagged in the storage device list within the detection time period, as described above in relation to FIGS. 2A and 2B.

In some examples, in response to a determination by monitor module 334 that recovery module 331 has reached the threshold stage for the threshold number of storage devices within the detection time period, module 332 may pause each storage device recovery procedure being performed by recovery module 331 for one of the storage devices. Additionally, in response to a determination by monitor module 334 that recovery module 331 has reached the threshold stage for the threshold number of storage devices within the detection time period, an analysis module 335 may determine whether the respective storage domain paths of the threshold number of storage devices include at least one common routing module. In some examples, module 335 may determine whether the paths include at least one common routing module in any manner described above in relation to FIGS. 1-2B. In response to a determination by module 335 that the respective storage domain paths for the flagged storage devices do not each include a common routing module, module 335 may cause recovery module 331 to resume each paused storage device recovery procedure.

In response to a determination by module 335 that the respective storage domain paths for the threshold number of storage devices include a common routing module, a disturbance module 336 may perform a storage domain disturbance procedure for the common routing module. In some examples, module 336 may provide a storage domain disturbance prediction notice 312 to device manager 315 as part of the disturbance procedure. In some examples, device manager 315 may include an agent application through which the notice 312 may be provided to a user (e.g., administrator) of computing device 300 (e.g., a server). In other examples, device manager 315 may implement at least a portion of an operating system of computing device 300. In such examples, device manager 315 may store the notice 312 in an event log of computing device 300. In some examples, the functionalities device manager 315 may be implemented in the form of executable instructions encoded on a machine-readable storage medium, in the form of electronic circuitry, or a combination thereof.

In other examples, module 336 may reset at least one common routing module of the respective storage domain paths, as determined by module 335, in any manner described above in relation to FIGS. 1-2B. For example, module 336 may provide a reset command to the common routing module to reset the common routing module. In examples in which the routing modules of the respective storage domain paths are SAS expanders, module 336 may reset each SAS expander of each of the respective storage domain paths of the threshold number of storage devices, as part of the domain disturbance procedure. In other examples, the domain disturbance procedure may include performance of any of the actions described above in relation to the disturbance response procedure described in relation to FIGS. 1-2B.

In the example of FIG. 3, module 336 may include a dual-domain module 337 that may command a first SAS expander of a storage enclosure to reset a second SAS expander of the storage enclosure, as part of the domain disturbance procedure. For example, as noted above, storage enclosure 385 includes SAS expanders 342 and 344, each connected to storage devices 352 and 354. In examples in which module 335 identifies one of expanders 342 and 344 as a common routing module, module 337 may command the other to reset the common routing module. For example, if module 335 determines that expander 342 is a common routing module of the respective storage domain paths of the flagged storage devices, module 337 may command expander 344 to reset expander 342. In other examples, module 337 may command expander 342 to reset expander 344 if module 335 determines that expander 344 is a common routing module. In this manner, SAS initiator 330 may reset an expander that is part of a dual domain configuration when the expander is not responding to reset commands from SAS initiator 330, for example.

In some examples, after module 336 resets the at least one common routing module, module 336 may clear the flags from the storage device list and determine whether communication with at least one of the flagged storage devices via at least one common routing module is successful. For example, after resetting the at least one common routing module, SAS initiator 330 may, for at least one of the flagged storage devices, the retry the failed I/O communication that triggered recovery module 331 to being the recovery procedure for the storage device.

In some examples, if communication through a common routing module that is part of a dual-domain configuration is unsuccessful after SAS initiator 330 provides a reset command to the common routing module, module 337 may command another routing module, included in the same storage enclosure as the common routing module, to reset the common routing module. For example, if module 335 determines that expander 342 is a common routing module, module 336 may provide a command to expander 342 to reset the expander. If communication through expander 342 is unsuccessful after providing the reset command, then module 337 may command expander 344 to reset expander 342. In some examples, module 337 may also command expander 342 to reset expander 344 if communication through expander 344 is unsuccessful after module 336 provides a reset command to expander 344. In some examples, functionalities described herein in relation to FIG. 3 may be provided in combination with functionalities described herein in relation to any of FIGS. 1-2B and 4-5.

Figure 4:
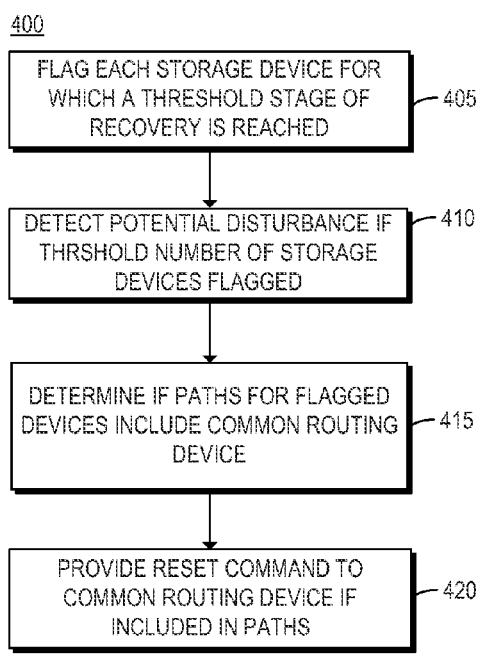
FIG. 4 is a flowchart of an example method for providing a reset command to a routing module of a storage domain path.

FIG. 4 is a flowchart of an example method 400 for providing a reset command to a routing module of a storage domain path. Although execution of method 400 is described below with reference to SAS initiator 330 of FIG. 3, other suitable components for execution of method 400 can be utilized (e.g., storage controller 105 or 205). Additionally, method 400 may be implemented in the form of executable instructions encoded on a machine-readable storage medium, in the form of electronic circuitry, or a combination thereof.

At 405 of method 400, tracker module 332 of SAS initiator 330 may flag, at a storage controller such as SAS initiator 330, each storage device for which a threshold stage of a storage device recovery procedure is reached by SAS initiator 330. In some examples, each of the storage devices flagged at 405 may be one of a plurality of storage devices connected to receive I/O communications from SAS initiator 330 via a respective storage domain path of storage domain paths 370. For example, module 332 may flag the storage devices in a storage device list stored on SAS initiator 330.

At 410, monitor module 334 may detect a potential storage domain disturbance if a threshold number of the storage devices are flagged within a detection time period. For example, in response to the storage device list being updated to indicate that the recovery module has reached the threshold stage for one of the storage devices, module 334 may examine the storage device list. In such examples, module 334 may detect a potential storage domain disturbance if module 334 determines, from the storage device list, that SAS initiator 330 (e.g., a recovery module 331) has reached the threshold stage for the threshold number of storage devices within the detection time period.

At 415, in response to detection of the potential storage domain disturbance, analysis module 335 of SAS initiator 330 may determine whether the respective storage domain paths for the flagged storage devices each include a common routing module. In some examples, module 335 may make this determination based on representations of the respective storage domain paths stored in the storage device list, as described above in relation to FIGS. 1-3. At 420, in response to a determination by module 335 that the respective storage domain paths for the flagged storage devices each include a common routing module, a module 336 of SAS initiator 330 may provide a reset command to the common routing module. In some examples, functionalities described herein in relation to FIG. 4 may be provided in combination with functionalities described herein in relation to any of FIGS. 1-3 and 5.

Figure 5:
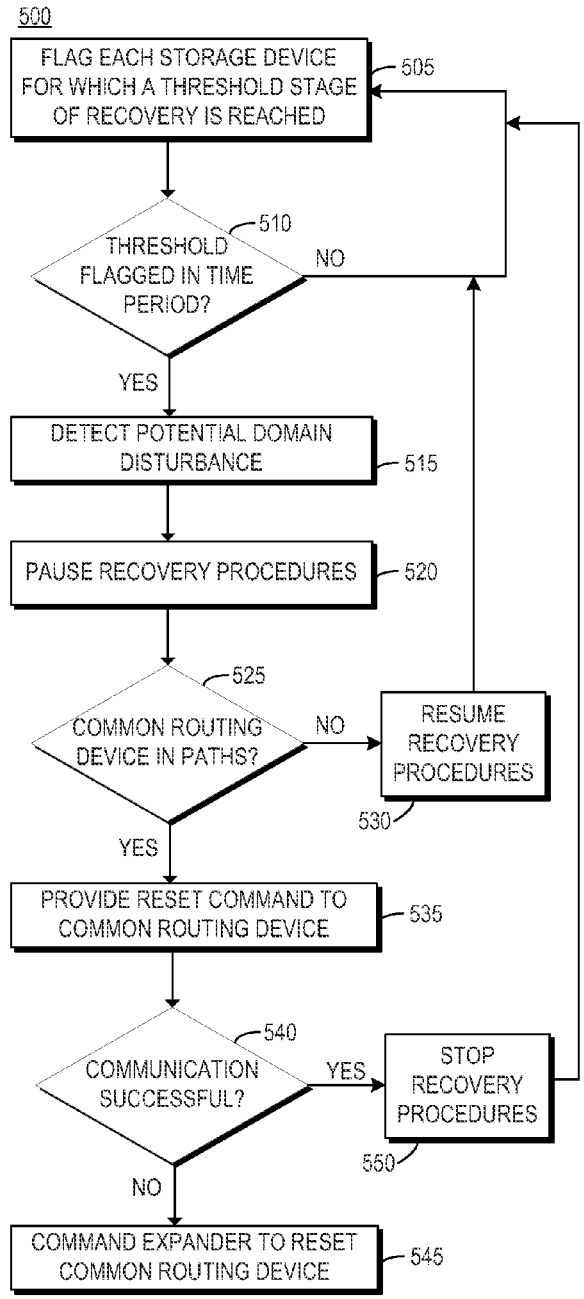
FIG. 5 is a flowchart of an example method for pausing a storage device recovery procedure in response to detection of a potential storage domain disturbance.

FIG. 5 is a flowchart of an example method 500 for pausing a storage device recovery procedure in response to detection of a potential storage domain disturbance. Although execution of method 500 is described below with reference to SAS initiator 330 of FIG. 3, other suitable components for execution of method 500 can be utilized (e.g., storage controller 105 or 205). Additionally, method 500 may be implemented in the form of executable instructions encoded on a machine-readable storage medium, in the form of electronic circuitry, or a combination thereof.

At 505 of method 500, tracker module 332 of SAS initiator 330 may flag, at a storage controller such as SAS initiator 330, each storage device for which a threshold stage of a storage device recovery procedure is reached by SAS initiator 330. In some examples, module 332 may flag the storage devices in a storage device list stored on SAS initiator 330 for a plurality of storage devices connected to receive I/O communications from SAS initiator 330 via respective storage domain paths of storage domain paths 370.

At 510, monitor module 334 may determine whether a threshold number of the storage devices are flagged within a detection time period. For example, in response to the storage device list being updated to indicate that the recovery module has reached the threshold stage for one of the storage devices, module 334 may examine the storage device list to determine whether SAS initiator 330 (e.g., a recovery module 331) has reached the threshold stage for the threshold number of storage devices within the detection time period based on, for example, the flag and time information stored in the storage device list. If not, then method 500 may proceed to 505.

If monitor module 334 determines that a threshold number of the storage devices were flagged within the detection time period, then monitor module 334 may, in response, detect a potential storage domain disturbance at 515. Additionally, in response to detection of the potential storage domain disturbance at 515, method 500 may proceed to 520, where module 332 may pause each storage device recovery procedure being performed by SAS initiator 330 (e.g., recovery module 331) for one of the storage devices. In some examples, at 520, module 332 may also pause any storage device recovery procedures that would otherwise be started by SAS initiator 330 (e.g., in response to detection of an I/O communication failure).

After pausing the recovery procedures, analysis module 335 of SAS initiator 330 may, at 525, determine whether the respective storage domain paths for the flagged storage devices each include at least one common routing module. In some examples, module 335 may make this determination based on representations of the respective storage domain paths stored in the storage device list, as described above in relation to FIGS. 1-3. If module 335 determines at 525 that the respective storage domain paths for the flagged storage devices do not include a common routing module, then method 500 may proceed to 530 where module 335 may cause recovery module 331 to resume each paused storage device recovery procedure. In such examples, module 335 may also cause module 331 to resume recovery procedures paused prior to beginning as described above. After resuming the recovery procedures at 530, method 500 may proceed to 505.

If module 335 determines at 525 that the respective storage domain paths for the flagged storage devices include a common routing module, then method 500 may proceed to 535, where module 336 of SAS initiator 330 may provide a reset command to the common routing module. In some examples, module 336 may provide reset commands to a plurality of common routing modules identified by module 335, as described above in relation to FIGS. 1-3.

After module 336 provides at least one reset command at 535, method 500 may proceed to 540, where module 336 may determine whether communication with a flagged storage device via a common routing module is successful after providing the reset command to the common routing module. In some examples, the common routing module may be a SAS expander. In such examples, module 336 may provide a command to reset the common SAS expander at 535, and determine, at 540, whether communication with a flagged storage device via the common SAS expander is successful after providing the reset command to the common SAS expander. If module 336 determines that communication is successful, then method 500 may proceed to 550, where module 335 may cause recovery module 331 to stop each paused storage device recovery procedure. Also at 550, in some examples, module 336 may cause module 332 to clear each flag from the storage device list and retry the respective failed I/O communications for each of the previously flagged storage devices. After at least stopping the paused recovery device procedures at 550, method 500 may proceed to 505.

If the communication after providing the reset command to the common routing module was unsuccessful, then method 500 may proceed to 545, where module 337 may command another routing module of a storage enclosure including the common routing module to reset the common routing module. In some examples, both routing modules of the storage enclosure may be SAS expanders. In some examples, functionalities described herein in relation to FIG. 5 may be provided in combination with functionalities described herein in relation to any of FIGS. 1-4.

What is claimed is:

1. A non-transitory machine-readable storage medium encoded with instructions executable by a processor of a storage controller of a computing device, wherein the instructions are to cause the processor to: detect, for each storage device of a plurality of storage devices connected to receive input/output (I/O) communications from the storage controller via a respective storage domain path, whether the storage controller has reached a threshold stage of a storage device recovery procedure for the storage device;
   detect a potential storage domain disturbance if the storage controller has reached the threshold stage for each of a threshold number of the storage devices within a detection time period;
   determine, in response to detecting the potential storage domain disturbance, whether the respective storage domain paths, for the storage devices for which the storage controller has reached the threshold stage, include a common routing module; and
   perform a disturbance response procedure, in response to a determination that the respective storage domain paths include a common routing module.

2. The non-transitory machine-readable storage medium of claim 1, wherein the instructions to perform the storage domain disturbance procedure comprise instructions to:
   reset the common routing module.

3. The non-transitory machine-readable storage medium of claim 2, wherein the instructions to perform the storage domain disturbance procedure comprise instructions to:
   command the common routing module to enter a reduced functionality mode prior to the common routing module being reset.

4. The non-transitory machine-readable storage medium of claim 2, wherein the instructions to perform the storage domain disturbance procedure comprise instructions to:
   reset each common routing module among the respective storage domain paths for the storage devices for which the storage controller has reached the threshold stage.

5. The non-transitory machine-readable storage medium of claim 4, wherein the instructions to perform the storage domain disturbance procedure comprise instructions to:
   for each of the respective storage domain paths for the storage devices for which the storage controller has reached the threshold stage, reset each routing module along the storage domain path.

6. The non-transitory machine-readable storage medium of claim 1, wherein:
   the storage controller is a Serial Attached Small Computer System Interface (SAS) initiator;
   the instructions to determine comprise instructions to determine, in response to detecting the potential domain disturbance, whether the respective storage domain paths, for the storage devices for which the storage controller has reached the threshold stage, include a common SAS expander; and
   the instructions to perform comprise instructions to reset the common SAS expander, in response to a determination that the respective storage domain paths include a common SAS expander module.

7. A computing device comprising:
   a storage controller comprising:
   a recovery module to trigger a storage device recovery procedure for any storage device of a plurality of storage devices connected to receive input/output (I/O) communications from the storage controller via a respective storage domain path;
   a tracker module to track, for each of the storage devices, whether the recovery module has reached a threshold stage of the recovery procedure for the storage device;
   an analysis module to determine, in response to the recovery module reaching the threshold stage of the recovery procedure for a threshold number of the storage devices within a detection time period, whether the respective storage domain paths for the threshold number of storage devices include a common routing module; and
   a disturbance module to, in response to a determination that the respective storage domain paths for the threshold number of storage devices include a common routing module, perform a storage domain disturbance procedure for the common routing module.

8. The computing device of claim 7, wherein the tracker module is to maintain a storage device list indicating, for each of the storage devices, the respective storage domain path for the storage device and whether the recovery module has reached the threshold stage for the storage device.

9. The computing device of claim 8, wherein the tracker module comprises:
   a monitor module to determine, from the storage device list, whether the recovery module has reached the threshold stage for the threshold number of storage devices within the detection time period, in response to the storage device list being updated to indicate that the recovery module has reached the threshold stage for one of the storage devices.

10. The computing device of claim 7, wherein:
    the recovery module is to trigger the recovery procedure for a given storage device of the plurality of storage devices in response to a detection of an I/O communication failure in relation to the given storage device; and
    the threshold stage of the recovery procedure is a stage in which the recovery module is to reset the given storage device reset after retrying a failed I/O communication in connection with the given storage device.

11. The computing device of claim 7, further comprising:
    a device manager, wherein the disturbance module is to provide a storage domain disturbance prediction notice to the device manager as part of the domain disturbance procedure.

12. The computing device of claim 7, wherein:
    the storage controller is a Serial Attached Small Computer System Interface (SAS) initiator;
    the common routing module is an SAS expander; and
    the disturbance module is to reset each SAS expander of each storage domain path of each of the threshold number of storage devices as part of the domain disturbance procedure.

13. A method comprising:
    flagging, at a storage controller, each storage device, among a plurality of storage devices connected to receive input/output (I/O) communications from the storage controller via a respective storage domain path, for which a threshold stage of a storage device recovery procedure is reached by the storage controller;
    detecting, with the storage controller, a potential storage domain disturbance if a threshold number of the storage devices are flagged within a detection time period;
    determining whether the respective storage domain paths for the flagged storage devices each include a common routing module, in response to detection of the potential storage domain disturbance; and in response to a determination that the respective storage domain paths for the flagged storage devices each include a common routing module, providing a reset command to the common routing module.

14. The method of claim 13, further comprising:

pausing each storage device recovery procedure being performed by the storage controller for one of the storage devices, in response to detection of the potential storage domain disturbance; and resuming each paused storage device recovery procedure, in response to a determination that the respective storage domain paths for the flagged storage devices do not each include a common routing module.

15. The method of claim 14, wherein the common routing module is an SAS expander, the method further comprising:

determining whether communication with a flagged storage device via the common SAS expander is successful after providing the reset command to the common SAS expander;

if the communication after providing the reset command to the common SAS expander was unsuccessful, commanding another SAS expander, of a storage enclosure including the common SAS expander, to reset the common SAS expander; and if the communication after providing the reset command to the common SAS expander was successful, stopping each paused storage device recovery procedure.

* * * * *

UNITED STATES PATENT AND TRADEMARK OFFICE
CERTIFICATE OF CORRECTION

PATENT NO. : 9,160,637 B2  
APPLICATION NO. : 13/550678  
DATED : October 13, 2015  
INVENTOR(S) : Michael G. Myrah et al.

Page 1 of 1

It is certified that error appears in the above-identified patent and that said Letters Patent is hereby corrected as shown below:

Title Page, Item (75), Inventors, in column 1, line 2, delete "Rio" and insert -- Porto Alegre Rio --, therefor.

Title Page, Item (75), Inventors, in column 1, line 4, delete "Rio" and insert -- Porto Alegre Rio --, therefor.

Signed and Sealed this  
Eighth Day of March, 2016

Michelle K. Lee  
*Director of the United States Patent and Trademark Office*